Oct. 25, 1938.  C. C. BENNETT  2,134,500

WHEEL BALANCER—DYNAMIC—TYPE

Filed Jan. 14, 1935

Inventor
Claude C. Bennett
By Charles L. Reynolds
Attorney

Patented Oct. 25, 1938

2,134,500

UNITED STATES PATENT OFFICE 2,134,500

WHEEL BALANCER—DYNAMIC-TYPE

Claude C. Bennett, South Bend, Ind., assignor to A. E. Feragen, Inc., Seattle, Wash., a corporation of Washington Application January 14, 1935, Serial No. 1,687

10 Claims. (Cl. 73—51)

My invention relates to wheel balancing devices, particularly to such devices which will indicate the presence or absence of unbalance in a wheel which is rotating rapidly. It is sometimes the case that a wheel may be found properly balanced statically and yet will not be balanced dynamically, when rotating, so that such a wheel, on an automobile, will cause difficulties in steering and alignment while the automobile is traveling at any appreciable speed. It is a primary object of my invention to provide a device whereby the presence of such dynamic unbalance in a wheel may be discovered.

My device may also serve to balance such a wheel statically, and will serve to indicate the point where the maximum or minimum weight causing the unbalance is located.

It is a further object to provide such a balancing device in which a wheel support may be rotatably driven at an appreciable speed by power means, and which incorporates suitable indicating means to determine unbalance.

It is a further object to provide in such a wheel balancing device, means for accurately locating parts and a simple and easily adjustable indicating device.

Further objects, and particularly such as relate to the more purely structural details, will be ascertained as this specification progresses.

My invention comprises the novel parts, and the novel combination and arrangement thereof, as shown in the accompanying drawing, described in this specification, and as will be more particularly pointed out by the claims which terminate the same.

In the accompanying drawing I have shown my invention embodied in a form which at present is preferred by me, it being understood that various changes may be made in the form and the arrangement of the parts without departing from the scope of my invention, which will be ascertained in the claims.

Figures 2, 3:
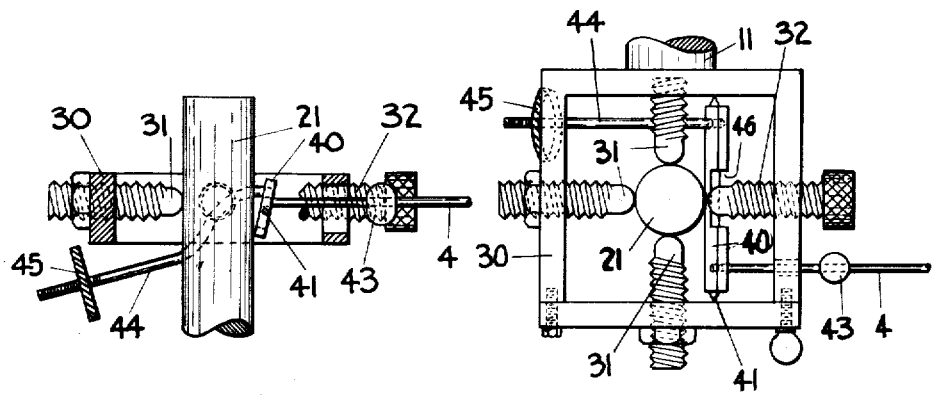
Figure 2 is a plan view of the indicator portion of my device.
Figure 3 is a transverse section through the same.
Figure 1:
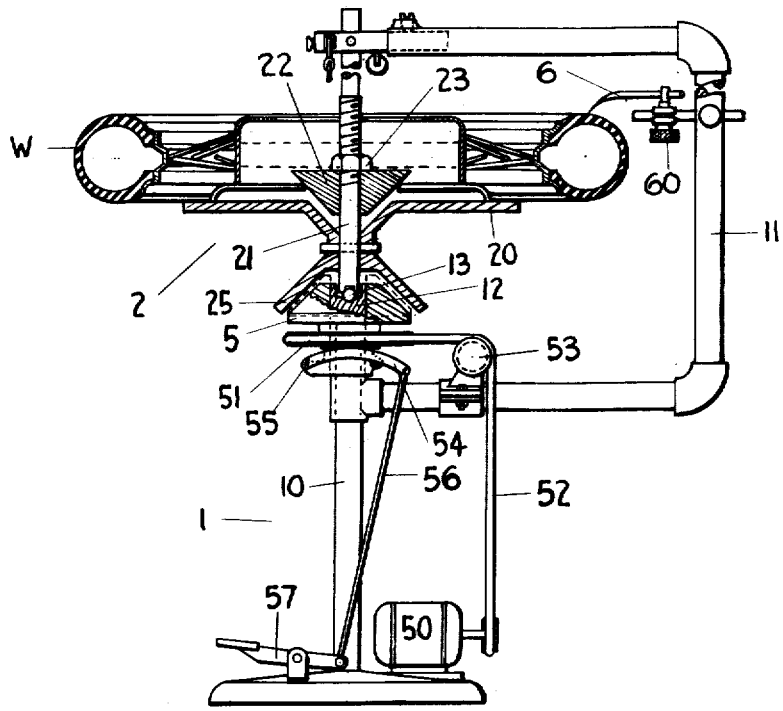
Figure 1 is an axial sectional view through the device, showing parts in position for operation.

The structure of the stand, generally designated by the numeral 1, is of little importance insofar as the principle of my invention is concerned. I have shown an upright pedestal 10 supporting a U-frame 11, the upright 10 carrying at its upper end any suitable bearing such as a cupped member 12 in which is seated a fulcrum ball 13. Generally supported on this bearing ball 13 is a wheel support 2 consisting of a platform 20 whereon a wheel W may rest, an upright post 21 which is axially disposed and the lower end of which rests upon the ball 13, and means such as the cone 22 and nut 23 threaded upon the post to center the wheel W upon the platform 20.

The upper end of the post 21 may tilt on the ball 13, unless restrained. It should be normally perfectly vertical, so that with a properly balanced wheel on the platform, and the platform and wheel rotating, the post will have no tendency to tilt. However, to dispose the wheel precisely upright, and to prevent its tilting when the wheel support is not rotating, suitable means may be provided engaging the upper end of the post. To this end I provide a frame 30 surrounding the upper end of the post and supported from the U-frame 11, and in the four sides of this frame I mount the bolts 31 and 32. There are three of the bolts 31, spaced by 90° around the post, and they would normally be adjusted relative to the frame 30 so that they hold the post precisely vertical except as it may move towards the bolt 32. If the bolt 32 is brought into contact with the post, then the post will be held against any tilting movement, but if the bolt 32 is withdrawn somewhat the post may tilt in this one direction. This tilting will be the result of unbalance in a wheel mounted upon the wheel support 2 and either rotating at some speed, or caused to tilt towards this bolt 32 when the heavy portion of the wheel rests generally beneath this bolt.

Accordingly this tendency to tilt the post may be taken advantage of to operate an indicator of any suitable type, so that as the post tilts, the indicator shows that the post has been displaced from its true vertical position in its normal axis of rotation. While any suitable device, movable by tilting of the post, may be employed, I prefer that this indicator take the form of a plate 40 supported in the frame 30 by pivots 41 between its upper and lower edges, engaging the post, and provided with means to indicate when it tilts. An arm 4, extending transversely from one side of the plate 40, carries a weight 43 which causes the edge of the plate at the opposite side of the pivot from the arm (in this instance the lower edge of the plate) to bear against the post 21. Since it is not desirable that any appreciable pressure be employed, as otherwise slight tilting of the post will not be noticeable, it will usually be found desirable to provide a second arm 44 extending from the opposite side of the plate 40 and carrying an adjustable weight 45, so that the weights 43 and 45 may be nearly balanced one against the other, yet an arm 4 or 44 of considerable length is provided, the oscillation of which as the plate 40 oscillates will serve to indicate any tilting of the post, and consequently serves as an indicator of unbalance in the wheel as it rotates. The plate 40 is notched, as indicated at 46, for passage of the tip of the screw 32.

Rotation of the wheel support 2 may be accomplished in any suitable or convenient manner. To that end, and by way of example, I have shown a clutch element 25 formed as a part of the wheel support, and a complemental clutch element 5 is mounted upon the member 12 at the upper end of the upright 10, this member 5 carrying a pulley 51 driven by a belt 52, carried over suitable guide pulleys 53, from a motor 50 mounted upon the base of the stand. Engagement of the clutch elements 5 and 25 is suitably controlled, as for example by an arm 54 pivoted at 55 and engageable beneath the clutch element 5, this arm being movable upwardly and downwardly by a link 56 connected to the treadle 57. When the clutch is engaged, a sufficiently large bearing surface is afforded to prevent appreciable tilting on the bearing 13, but when the rotation of the wheel has been brought up to the desired speed the clutch elements may be disengaged, leaving the post 21 free to tilt on the bearing 13 as the wheel continues to rotate.

The device thus will serve as a dynamic balancing device, but as I have indicated, it may also serve as a static balancing device, since even with slow rotation of the wheel support and wheel the post 21 will tilt if there is unbalance, and the indicator arm 4 or 44 will still indicate this unbalance. The device is also provided with a contact finger adjustably supported by any suitable arrangement, indicated at 60, to contact with the wheel or the tire thereon, and as the wheel is moved past the contact finger the latter will indicate the presence of wobble in the wheel. To this end the post must be held upright by the screws 31 and 32, or the clutch element 5 may be raised into a position where it will support the post substantially upright.

What I claim as my invention is:

1. A wheel balancing device comprising a stand, a wheel support, including a vertically disposed post centrally rotatably mounted on said stand to tilt realtive to its axis of rotation, means restraining tilting movement of said post except in one direction, a contact member engageable with the post to be moved when the post tilts due to unbalance in a wheel carried by the support, and indicator means operable by such movement of said contact member.

2. A wheel balancing device comprising a stand, a wheel support, including a vertically disposed post centrally rotatably mounted on said stand to tilt relative to its axis of rotation, means restraining tilting movement of said post except in one direction, a contact member pivoted on an axis transverse with respect to the post and engageable with the post, and a weighted arm pressing said contact member lightly against the post, and serving as an indicator movable when the post tilts due to unbalance in a wheel carried by the support.

3. A wheel balancing device comprising a stand, a wheel support including a vertically disposed post centrally rotatably mounted on said stand to tilt relative to its axis of rotation, means engageable with the upper end of the post and adjustable to dispose the latter precisely vertically and restraining tilting movement of said post except in one direction, a contact member engageable with the post to be moved when the post tilts due to unbalance in a wheel carried by the support, and indicator means operable by such movement of said contact member.

4. A wheel balancing device comprising a stand, a wheel support including a vertically disposed post centrally rotatably mounted on said stand to tilt relative to its normal axis of rotation, means engageable with the tiltable end of the post to dispose the latter precisely vertically and restraining tilting movement except in one direction, a plate pivotally mounted on an axis extending transversely of the direction of tilting disposed between its upper and lower edges adjacent the tiltable end of the post, a weight acting upon said plate to cause a lower edge to bear lightly against the post, and means to indicate oscillation of said plate under the influence of tilting of the post, as the wheel support rotates.

5. A wheel balancing device comprising a stand, a wheel support including a vertically disposed post centrally rotatably mounted on said stand to tilt relative to its normal axis of rotation, means engageable with the tiltable end of the post to dispose the latter precisely vertically and restraining tilting movement except in one direction, a plate pivotally mounted on a transverse axis between its upper and lower edges adjacent the tiltable end of the post, a weight acting upon said plate to cause a lower edge to bear lightly against the post, means to indicate oscillation of said plate under the influence of tilting of the post as the wheel support rotates, and power means to rotate said wheel support.

6. A wheel balancing device comprising a stand, a wheel support including a vertically disposed post centrally mounted on said stand to tilt relative to its normal axis of rotation, means engageable with the tiltable end of the post to dispose the latter precisely vertically and restraining tilting movement except in one direction, a plate pivotally mounted on a transverse axis between its upper and lower edges adjacent the tiltable end of the post, two arms extending laterally from said plate and from respectively opposite sides, weights adjustable along said arms to cause an edge of the plate to bear lightly against the post, said arms serving to indicate oscillation of the plate under the influence of tilting of the post, as the wheel support and post rotates.

7. A wheel balancing device comprising a stand, a wheel support including an upright axially disposed post centrally rotatably mounted on said stand to tilt relative to its normal axis of rotation, a frame open at one side and surrounding the upper end of said post, a bar removably positioned across the open side of said frame to permit swinging of the post from the frame, contact means supported in said frame and bar to dispose the post precisely vertically and to permit it to tilt in one direction only, and a plate supported in said frame to oscillate about an axis transverse to and at the side towards such direction of tilting and directly engageable with the post whereby its oscillation indicates tilting of the post and thereby unbalance of the wheel as they rotate.

8. A wheel balancing device comprising a stand, an upright shaft rotatably supported thereon, a wheel support carried by said shaft, means engageable with the upper end of said shaft to control tilting movement thereof effected by rotation on said wheel support of an unbalanced wheel, a plate mounted in said means to pivot about an axis transverse to said shaft and disposed to engage said shaft with an edge thereof, means urging said engaging plate edge to bear lightly against said shaft, and means to indicate oscillation of said plate, said means being effected by the varying pressure thereagainst of said tilting shaft.

9. A wheel balancing device comprising a stand, an upright shaft rotatably supported thereon, a wheel support carried by said shaft, rigid members fixed in positions spaced about the upper end of said shaft and engageable thereby to prevent tilting movement of the shaft in all but a single direction effected by rotation on said wheel support of an unbalanced wheel, and means disposed at the upper end of said shaft to indicate tilting thereof.

10. A wheel balancing device comprising a stand, an upright shaft rotatably supported thereon, a wheel support carried by said shaft, a fixed member encircling the upper end of said shaft and spaced therefrom, rigid means carried by said member and engageable by the shaft to limit tilting movement thereof effected by rotation on said wheel support of an unbalanced wheel, a plate journaled in said fixed member to swing about an axis transverse to said shaft, and disposed to engage said shaft with an edge thereof, means urging said engaging plate edge to bear lightly against said shaft, and means to indicate oscillation of said plate effected by the varying pressure thereagainst of said tilting shaft.

CLAUDE C. BENNETT.